United States Patent
Asami et al.

(10) Patent No.: US 7,007,464 B1
(45) Date of Patent: Mar. 7, 2006

(54) CATALYST WARMING CONTROL-APPARATUS

(75) Inventors: Kiyoshi Asami, Wako (JP); Shigeru Ibaraki, Wako (JP); Makoto Kishida, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/643,912

(22) Filed: Aug. 23, 2000

(30) Foreign Application Priority Data

Aug. 26, 1999 (JP) .................................. 11-240592
Jun. 27, 2000 (JP) ........................... P2000-193255

(51) Int. Cl.
*F01N 3/10* (2006.01)

(52) U.S. Cl. .................... 60/300; 60/284; 180/65.2; 180/65.4; 477/3

(58) Field of Classification Search ................. 60/284, 60/300, 303, 274, 285; 180/65.2, 65.3, 65.4, 180/65.8; 477/2, 3
See application file for complete search history.

(56) References Cited

U.S. PATENT DOCUMENTS

| | | | | |
|---|---|---|---|---|
| 5,323,868 A | * | 6/1994 | Kawashima | 180/65.4 |
| 5,327,991 A | * | 7/1994 | Yoshida | 180/65.4 |
| 5,414,994 A | * | 5/1995 | Cullen et al. | 60/274 |
| 5,492,190 A | * | 2/1996 | Yoshida | 180/65.4 |
| 5,566,774 A | * | 10/1996 | Yoshida | 180/65.4 |
| 5,588,498 A | * | 12/1996 | Kitada | 180/65.4 |
| 5,606,855 A | * | 3/1997 | Tomisawa | 60/274 |
| 5,613,360 A | * | 3/1997 | Iwai et al. | 60/284 |
| 5,751,137 A | * | 5/1998 | Kiuchi et al. | 60/285 |
| 5,771,478 A | * | 6/1998 | Tsukamoto et al. | 701/68 |
| 5,785,137 A | * | 7/1998 | Reuyl | 180/65.2 |
| 5,785,138 A | * | 7/1998 | Yoshida | 180/65.2 |
| 5,801,499 A | * | 9/1998 | Tsuzuki et al. | 180/65.2 |
| 5,846,155 A | * | 12/1998 | Taniguchi et al. | 477/2 |
| 5,946,907 A | * | 9/1999 | Nagaishi et al. | 60/284 |
| 6,032,753 A | * | 3/2000 | Yamazaki et al. | 180/65.3 |
| 6,089,017 A | * | 7/2000 | Ogawa et al. | 60/285 |
| 6,155,364 A | * | 12/2000 | Nagano et al. | 180/65.2 |
| 6,253,866 B1 | * | 7/2001 | Kojima | 180/65.2 |
| 6,427,793 B1 | * | 8/2002 | Hanada et al. | 180/65.2 |
| 6,810,977 B1 | * | 11/2004 | Suzuki | 180/65.2 |
| 6,892,541 B1 | * | 5/2005 | Suzuki | 60/706 |

FOREIGN PATENT DOCUMENTS

JP          07-79503          3/1995

* cited by examiner

*Primary Examiner*—Tu M. Nguyen
(74) *Attorney, Agent, or Firm*—Westerman, Hattori, Daniels & Adrian LLP

(57) ABSTRACT

The catalyst warming control apparatus of the present invention is provided for a hybrid vehicle having an internal combustion engine, a generator for generating electric power from the output from the internal combustion engine, a power storage unit for storing electric power generated by the generator, and an electric motor driven by the electric power stored in the power storage unit, the hybrid vehicle being driven by at least one of the outputs from the internal combustion engine and the motor. The catalyst warming control apparatus includes a temperature detector for detecting the temperature of a catalyst or a value relating to the same; a first comparison circuit for comparing the detected result from the temperature detector with a preset reference value; and a control circuit for allowing the generator to generate electric power and to store the power in the power storage unit when the internal combustion engine is driven, and when the detected result by the temperature detector is equal to or below the reference value according to the output from the comparison circuit.

2 Claims, 2 Drawing Sheets

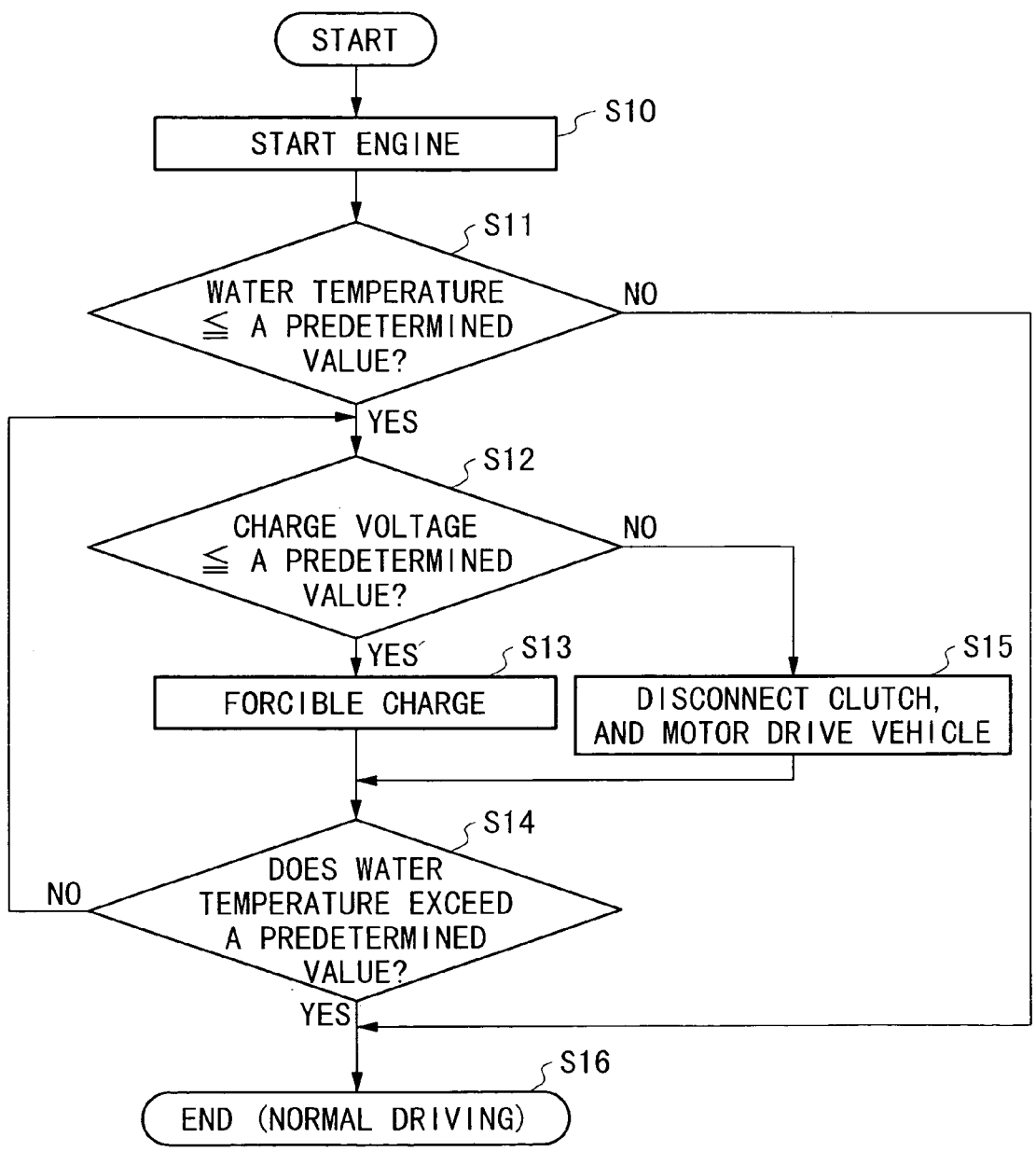

CATALYST WARMING CONTROL-APPARATUS

BACKGROUND OF THE INVENTION

1. Field of the Invention

The present invention relates to a catalyst warming control apparatus for a hybrid vehicle, and in particular, a technique for cleaning exhaust gas discharged from a hybrid vehicle which has an electric motor and a internal combustion engine (hereinafter referred to simply as an "engine").

This application is based on Japanese Patent Application Nos. 11-240592 and 2000-193255, the contents of which are incorporated herein by reference.

2. Description of the Related Art

A catalyst for cleaning exhaust gas discharged from an engine, when it is cold, is not sufficiently activated, cannot satisfactorily perform the cleaning function, and there is a problem that the exhaust gas contaminated with pollutants may be discharged to the air.

Conventional techniques detect the temperature of the catalyst, and activate the catalyst by reducing the engine speed and the load on the engine to restrict the discharge of the exhaust gas when the catalyst is not sufficiently activated according to the measured temperature, or by heating the catalyst when its temperature is low (as disclosed in Japanese Unexamined Patent Application, First Publication Hei 7-79503).

Of the above-mentioned conventional techniques, the technique which includes restricting the engine speed and the load on the engine when the catalyst is cold also restricts the warm-up of the catalyst by restricting the load on the engine. On the other hand, in the technique which includes warming the catalyst by the heater, the heater makes the exhaust system complicated and increases the size of the system. Further, because electric power must be supplied to the heater, there is the problem that the electric power consumption of a battery is increased.

BRIEF SUMMARY OF THE INVENTION

It is therefore an object of the present invention to provide a catalyst warming control apparatus which promptly warms and activates a catalyst, eliminating the catalyst heater. The hybrid vehicle may stop the engine when the engine is sufficiently warmed up, and this invention can shorten the time required to enter the state in which the engine is stopped.

In the first aspect of the present invention, the catalyst warming control apparatus is provided for a hybrid vehicle having an internal combustion engine (E), a generator (MTRa1) for generating electric power from the output from the internal combustion engine, a power storage unit (the battery 21) for storing electric power generated by the generator, and an electric motor (MTRb13) driven by the electric power stored in the power storage unit, the hybrid vehicle being driven by at least one of the outputs from the internal combustion engine and the motor. The catalyst warming control apparatus comprises: a temperature detector (the water temperature sensor 23, or the catalyst temperature sensor 26) for detecting the temperature of a catalyst or a value relating to the same; a first comparison circuit (the control circuit 18) for comparing the detected result from the temperature detector with a preset reference value; and a control circuit (18) for allowing the generator to generate electric power and to store the power in the power storage unit when the internal combustion engine is driven, and when the detected result by the temperature detector is equal to or below the reference value according to the output from the comparison circuit.

The invention of the first aspect measures the temperature of the catalyst or a value relating to the same. When the measured value is equal to or below the reference value, the generator generates electric power, and stores it in the power storage unit. This increases the load on the engine, and prompts the warm-up of the engine, so that the catalyst can be quickly activated.

In the second aspect of the present invention, the catalyst warming control apparatus further comprises: a remaining charge detector (the voltage sensor 22) for detecting a remaining charge of the power storage unit or a value relating to the same; and a second comparison circuit (the control circuit 18) for comparing the detected result from the remaining charge detector with a preset reference value relating to the remaining charge. The control circuit drives the vehicle by the output from the internal combustion engine, and allows the generator to generate electric power and to store the power in the power storage unit, when the detected result from the temperature detector is equal to or below the reference value according to the output from the first comparison circuit, and when the detected result from the remaining charge detector is equal to or below the reference value relating to the remaining charge according to the output from the second comparison circuit.

The invention of the second aspect further measures the remaining charge of the power storage unit or a value relating to the same, and compares it with the reference value relating to the remaining charge. When the remaining charge or the value relating to the same is equal to or below the reference value relating to the remaining charge, the control circuit drives the vehicle by the output from the internal combustion engine, and the generator generates electric power and stores it in the power storage unit.

This increases the load on the internal combustion engine to warm this engine, and also increases the temperature of the exhaust gas sent from the internal combustion engine, thereby warming the catalyst.

In the third aspect of the present invention, the catalyst warming control apparatus further comprises: a remaining charge detector (the voltage sensor 22) for detecting a remaining charge of the power storage unit or a value relating to the same; and a second comparison circuit (the control circuit 18) for comparing the detected result from the remaining charge detector with a preset reference value relating to the remaining charge, wherein The control circuit allows the generator to generate electric power, and drives the vehicle by the generated electric power and the stored electric power, when the detected result from the temperature detector is equal to or below the reference value according to the output from the first comparison circuit, and when the detected result from the remaining charge detector is above the reference value relating to the remaining charge according to the output from the second comparison circuit.

The invention of the third aspect measures the remaining charge or a value relating to the same, and compares it with the reference value relating to the remaining charge. When the remaining charge or the value relating to the same is above the reference value relating to the remaining charge, the generator generates electric power, and stores it in the power storage unit, and the motor drives the vehicle.

Therefore, for example, the heat produced by driving the motor increases the temperature of the cooling water. Thus, cooling of the internal combustion engine slows down because the internal combustion engine and the motor are cooled by the same cooling water, thereby shortening the time required for warming-up. Further, the load on the internal combustion engine is increased, so that the time required to warm up the internal combustion engine is shortened and the catalyst is quickly activated.

In the fourth aspect of the present invention, the control circuit allows the generator to generate electric power, and drives the vehicle by the motor, when the detected result from the temperature detector is equal to or below the reference value according to the output from the first comparison circuit, and when the detected result from the remaining charge detector is above the reference value relating to the remaining charge according to the output from the second comparison circuit.

The invention of the fourth aspect measures the remaining charge of the power storage unit or a value relating to the same, and compares it with the reference value relating to the remaining charge. When the remaining charge or the value relating to the same is equal to or below the reference value relating to the remaining charge, the control circuit drives the vehicle by the output from the internal combustion engine. When the remaining charge or the value relating to the same is above the reference value relating to the remaining charge, the generator generates electric power, and the motor drives the vehicle by the generated power. By means of this, the storage or discharge of the power is controlled depending on the remaining charge of the power storage unit, and the catalyst can be appropriately activated.

BRIEF DESCRIPTION OF THE DRAWINGS

FIG. 2 is a flowchart for explaining the operation of the hybrid vehicle shown in FIG. 1.

DETAILED DESCRIPTION OF THE INVENTION

Figure 1:
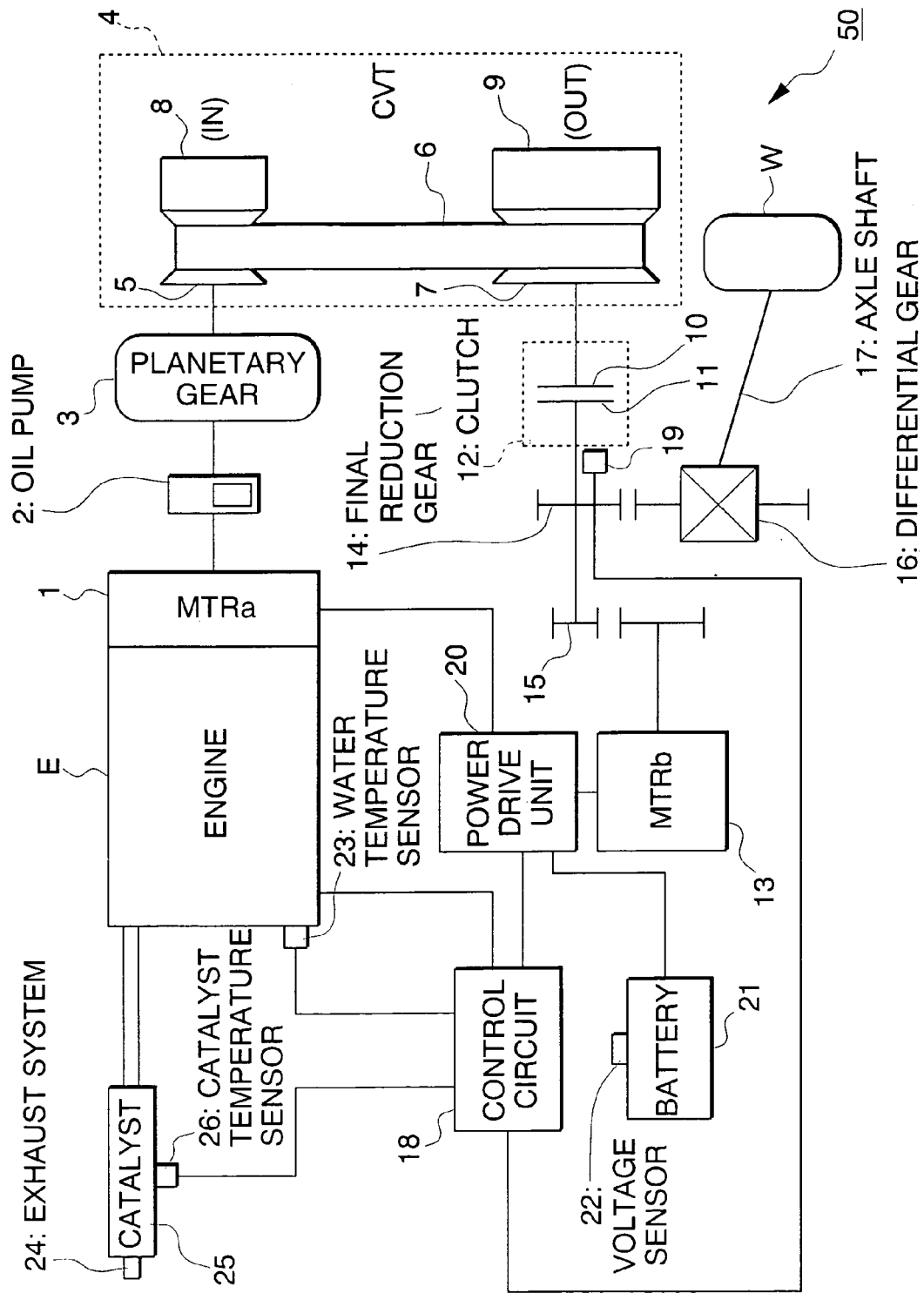
FIG. 1 is a block diagram showing the construction of the hybrid vehicle to which the catalyst warming control apparatus of the present invention is applied.

Hereinafter, the embodiment of the present invention is described with reference to the figures. FIG. 1 is a block diagram schematically showing the construction of the hybrid vehicle 50 of the first embodiment of the present invention. In this figure, the drive power from the engine E is input to a planetary gear 3 which switches between forward and reverse driving, via a submotor MTRa1 and an oil pump 2. The submotor MTRa1 receives the output from the engine E, generates electric energy, and outputs the generated electric energy to a power drive unit 20. The planetary gear 3 is mechanically connected to a selecting lever, not shown. When the driver switches the selecting lever, the rotational direction of the power from the engine E, which is input to a drive side pulley 5 of a CVT (Continuously Variable Transmission) 4, is switched.

The rotation of the drive side pulley 5 is transmitted via metal belt 6 to a driven side pulley 7. Here, the revolution ratio between the drive side pulley 5 and the driven side pulley 7 is determined by the winding diameter of each pulley with respect to the metal belt 6. This winding diameter is adjusted by moving the side chambers 8 and 9 of the pulleys by the applied force generated by oil pressure applied from the sides of the pulleys with respect to the direction of the rotational axes of the side chambers 8 and 9. This oil pressure is generated by the oil pump 2 driven by engine E and is supplied to the side chambers 8 and 9 via an oil pressure control apparatus.

The driven side pulley 7 is connected to the output axle of a main motor MTRb13 via a clutch 12 comprising a pair of engaging elements 10 and 11. A final reduction gear 14, and a gear 15 are connected between the clutch 12 and the main motor MTRb13. The drive power of the driven side pulley 7 is communicated to a differential gear 16 via the final reduction gear 14, and the transmitted drive power is further transmitted to vehicle axle 17, and the drive wheel W is made to rotate.

A control circuit 18 is connected with the oil pressure control apparatus, and is capable of measuring the oil pressure supplied to the side chambers 8 and 9 of CVT 4 via the oil pressure control apparatus. By means of this, the control circuit 18 is able to assess and control the transmission gear ratio of the CVT 41.

Further, the control circuit 18 is connected to a clutch control actuator 19 for controlling the engagement or disengagement of the engaging elements 10 and 11 of the clutch 12, and controls the engaging/releasing operation of the clutch 12 via the clutch control actuator 19. The control circuit 18 stores in advance a water temperature reference value, a voltage reference value, and a catalyst temperature reference value, compares the detection (measurement) results from a voltage sensor 22, a water temperature sensor 23, and a catalyst temperature sensor 26 with these reference values, and performs the control depending on the results of the comparisons (the details will be described below).

The water temperature reference value, the voltage reference value, and the catalyst temperature reference value will be explained.

The engine E, the submotor MTRa1, the power drive unit 20, and the main motor MTRb13 are cooled by the same cooling water. The water temperature reference value is a threshold value for determining whether the warm-up of the engine is completed, based on the temperature of the cooling water in the engine E. When the detected temperature of the cooling water is above the temperature reference value, it is determined that the engine is warmed up. When below the temperature reference value, it is determined that the engine is cold (is required to be warmed up). When the warm-up of the engine is completed, it can be determined that the catalyst 25 is fully warmed up, and is activated. While the engine is being warmed up, the catalyst 25 is also warmed up by the exhaust gas discharged from the engine E, and the exhaust gas undergoes reduction-oxidation reaction on the catalyst 25 so that the temperature of the catalyst 25 rises and the catalyst 25 cleans the exhaust gas. In the claims, a catalyst temperature and a value relating to the same includes the temperature of the cooling water.

The voltage reference value is a value for determining whether the battery 21 requires charge, and is compared with the measured charge voltage of the battery 21. When the measured voltage is equal to or below the voltage reference value, the remaining charge of the battery 21 is equal to or below the remaining charge reference value, and it can be determined that the battery 21 must be charged. The voltage reference value has hysteresis. When the charge voltage of the battery 21 is increasing, a high voltage reference value is used. When the charge voltage is decreasing, a low voltage reference value is used. This prevents frequent switching between forcible charge, which will be described below, and driving by the motor, and increases the quality of the product. Here, although the charge voltage is substituted for the remaining charge of the battery 21, the remaining charge may be measured by integrating the electric current.

The claims contain "a remaining charge or a value relating to the same", and "a remaining charge reference value or a value relating to the same" which include the charge voltage, and the voltage reference value.

The catalyst temperature reference value is a threshold value for determining whether the catalyst 25 has been activated. When the measured catalyst temperature is above the catalyst temperature reference value, it can be determined that the catalyst has been activated.

Based on the control signal from the control circuit 18, the power drive unit 20 controls the rotations of the motors MTRa1 and MTRb13. The power drive unit 20 stores the electric energy, which is generated by the submotor MTRa1, to the battery 21, the battery 21 supplies the power to the main motor MTRb13, or the electric energy is directly supplied to the main motor MTRb13. Thus, the main motor MTRb13 is made to rotate.

The main motor MTRb13 is driven by the electric power supplied from the power drive unit 20, and the rotational power is transmitted via the gear 15, the final reduction gear 14, and the differential gear 16 to the vehicle axle 17, and the drive wheels W are made to rotate.

The voltage sensor 22 is provided in the battery 21, detects (measures) the charge voltage of the battery 21, and outputs detected results to the control circuit 18.

The water temperature sensor 23 detects (measures) the temperature of the cooling water for cooling the engine E, and outputs detected results to the control circuit 18.

An exhaust system 24 discharges exhaust gas from the engine E into the atmosphere. The catalyst 25 for cleaning the exhaust gas, and a catalyst temperature sensor 26 for detecting (measuring) the temperature of the catalyst 25 are provided in the exhaust system 24.

The operation of the catalyst warming control apparatus for the hybrid vehicle 50 will be explained with reference to the flowchart of FIG. 2. When the engine E is started (step S10), the water temperature sensor 23 detects the temperature of the cooling water, and outputs the detected result to the control circuit 18.

On reception of the detected result from the water temperature sensor 23, the control circuit 18 compares it with the water temperature reference value which is stored in advance (step S11). When the temperature of the cooling water is above the water temperature reference value (step S11), the control circuit 18 determines that the warm-up is not required, and terminates the warm-up control for the catalyst (step S16).

When the temperature of the cooling water is equal to or below the water temperature reference value (step S11), the control circuit 18 reads the voltage value of the battery measured by the voltage sensor 23, and compares it with the voltage reference value which is stored in advance (step S12). When the voltage value of the battery 21 is equal to or below the voltage reference value, the control circuit 18 performs control of forcible charge mode. That is, the clutch is engaged by the clutch control actuator 19, the hybrid vehicle 50 is driven by the output from the engine E, the submotor MTRa1 receives the output from the engine E, generates electric energy, and charges the battery 21 (step S13).

Next, the control circuit 18 compares the detected result output from the water temperature sensor 23 with the water temperature reference value (step S14). When the temperature of the cooling water is above the water temperature reference value, the control circuit 18 terminates the warm up control for the catalyst (step S16).

On the other hand, when the temperature of the cooling water is equal to or below the water temperature reference value, the control circuit 18 reads the detected result output from the voltage sensor 22, and compares it with the voltage reference value (step S12). When the detected result is above the voltage reference value, the control circuit 18 releases the clutch 12 via the clutch control actuator 19, the submotor MTRa1 receives the output from the engine, generates electric energy, and charges the battery 21 via the power drive unit 20. The control circuit 18 supplies the power from the battery 21 to the main motor MTRb13 via the power drive unit 20, drives the main motor MTRb13, and drives the hybrid vehicle 50 by the drive power from the main motor MTRb13 (step S15).

While the above embodiment detects the temperature of the cooling water by the water temperature sensor 23, the catalyst temperature sensor 26 for directly detecting the temperature of the catalyst 25 may be substituted for the water temperature sensor 23, the output from the catalyst temperature sensor 26, instead of the output from the water temperature sensor 23, may be directly connected to the input terminal of the control circuit 18, and the control circuit 18 may compare it with the catalyst temperature reference value. Thus, the temperature of the catalyst 25 can be directly detected, and it can be determined whether the catalyst 25 is activated. In this case, when the catalyst 25 is not activated, the catalyst 25 can be warmed up according to the procedure of steps S12 to S16.

Further, devices other than the temperature sensor 23 and the catalyst sensor 26 may be employed as long as the temperature of the catalyst is reflected in the value which is measured. For example, as a simple method, the warm-up control may be performed from the time that the engine is started until the timer has counted to a preset time. The preset time from the time the engine is started may be used as the standard for determining the temperature of the catalyst.

Although in the first and second embodiments the submotor MTRa1 is directly connected to the engine E, the submotor may be connected by a gear of a given/specified ratio.

To charge the battery 21, the main motor MTRb13 may generate electric energy from the rotation transmitted via the gear 15, and the generated energy may be charged to the battery 21 via the power drive unit 20. Further, the submotor MTRa1 may be driven by the power supplied from the battery 21, or may be directly driven by the electric power generated by the main motor MTRb13, to thereby drive the hybrid vehicle 50.

As described above, according to this invention, when the internal combustion engine is driven, it is determined whether the catalyst is activated. When the catalyst is not activated, the generator generates electric power, and stores it in the power storage unit. This increases the load on the engine, and prompts the warm-up of the engine, so that the catalyst can be quickly activated.

According to the second aspect of the invention, it is determined whether the catalyst is activated. When the catalyst is not activated, the remaining charge of the power storage unit or a value relating to the same is measured. When the power storage unit must be charged, the vehicle drives and the generator charges the power storage unit by the output from the internal combustion engine. This increases the load on the internal combustion engine. Therefore, the temperature of the exhaust gas sent from the internal combustion engine is increased, thereby warming the catalyst.

According to the third aspect of the invention, when the catalyst is not activated, and when the power storage unit does not have to be charged, the power storage unit is charged while the stored or generated electric energy is supplied to the motor, and the motor drives the vehicle. Therefore, for example, the heat produced by driving the motor increases the temperature of the cooling water. Thus, cooling of the internal combustion engine slows down because the internal combustion engine and the motor are cooled by the same cooling water, thereby shortening the time required for warming-up. Further, the load on the internal combustion engine is increased by the driving the internal combustion engine and by supplying the electric power to the motor, so as to shorten the time required to warm up the internal combustion engine, and the catalyst can be quickly activated.

According to the fourth aspect of the invention, the remaining charge of the power storage unit or a value relating to the same is measured, and is compared with the reference value relating to the remaining charge. When the remaining charge or the value relating to the same is equal to or below the reference value relating to the remaining charge, the internal combustion engine drives the vehicle, and the generator generates electric power and stores it in the power storage unit. When the remaining charge or the value relating to the same is above the reference value relating to the remaining charge, the generator generates electric power, the electric power is stored in the power storage unit, and the motor drives the vehicle by the generated power. Thus, when the catalyst is not activated, the internal combustion engine is warmed while the load on the internal combustion engine is increased by the generation and storage of the electric power so as to activate the catalyst quickly. When the remaining charge or the value relating to the same is above the reference value relating to the remaining charge, the overcharge of the power storage unit can be prevented by consuming the stored electric energy.

This invention may be embodied in other forms or carried out in other ways without departing from the spirit thereof. The present embodiments are therefore to be considered in all respects illustrative and not limiting, the scope of the invention being indicated by the appended claims, and all modifications falling within the meaning and range of equivalency are intended to be embraced therein.

What is claimed is:

1. A catalyst warming control apparatus for a hybrid vehicle asserting control over the vehicle both when the vehicle is moving and when the vehicle is standing still, having an internal combustion engine, a generator for generating electric power from an output of the internal combustion engine, a power storage unit for storing electric power generated by the generator, and an electric motor driven by the electric power stored in the power storage unit, the hybrid vehicle being driven by at least one of the internal combustion engine and the motor, the catalyst warming control apparatus comprising:

a clutch for performing the connection or disconnection of the transmission of the power between the generator connected to the engine, and the motor;

a coolant temperature detector for detecting an engine temperature of the internal combustion engine;

a temperature detector for detecting the temperature of a catalyst or a value relating to the same, wherein the value relating to the same includes the temperature of vehicle cooling water;

a first comparison circuit for comparing the detected engine temperature with a preset first reference value;

a control circuit for allowing the generator to generate electric power and to store the power in the power storage unit when the internal combustion engine is driven, and when the detected engine temperature is equal to or below the first reference value;

a remaining charge detector for detecting a remaining charge of the power storage unit or a value relating to the same;

a second comparison circuit for comparing the detected result from the remaining charge detector with a preset second reference value relating to the remaining charge, wherein the control circuit drives the vehicle by the output from the internal combustion engine, engages the clutch, and allows the generator to generate electric power and to store the power in the power storage unit, when the detected result from the temperature detector is equal to or below the reference value according to the output from the first comparison circuit, and when the detected result from the remaining charge detector is equal to or below the second reference value relating to the remaining charge according to the output from the second comparison circuit; and wherein the control circuit allows the generator to generate electric power, disengages the clutch, and drives the vehicle by the generated electric power and stores the electric power, when the detected result from the temperature detector is equal to or below the first reference value according to the output from the first comparison circuit, and when the detected result from the remaining charge detector is above the second reference value relating to the remaining charge according to the output from the second comparison circuit.

2. A catalyst warming control apparatus according to claim 1, wherein the control circuit allows the generator to generate electric power, and drives the vehicle by the motor, when the detected result from the temperature detector is equal to or below the reference value according to the output from the first comparison circuit, and when the detected result from the remaining charge detector is above the reference value relating to the remaining charge according to the output from the second comparison circuit.

* * * * *